Robert L. Appler
Hubert H. Hoehn
INVENTOR

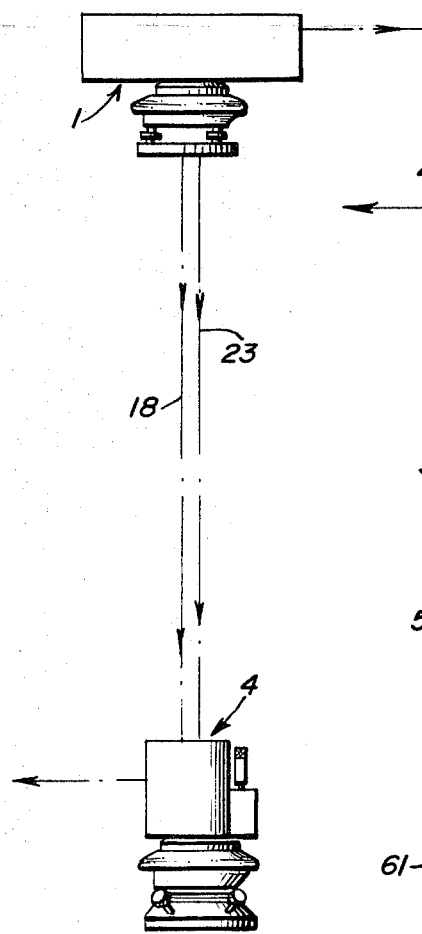
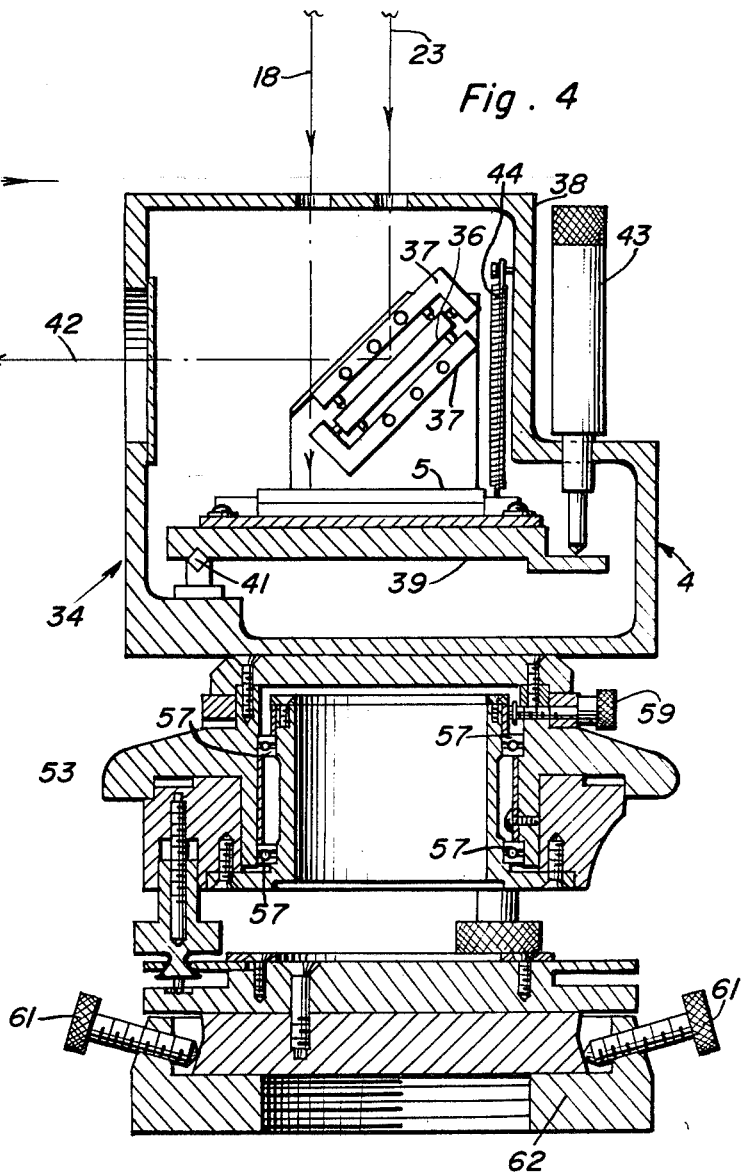
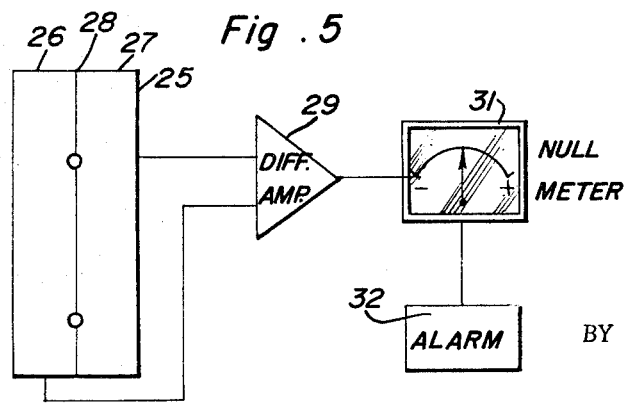
Robert L. Appler
Hubert H. Hoehn
INVENTOR

BY
ATTORNEY

Robert L. Appler
Hubert H. Hoehn
INVENTOR

United States Patent Office 3,667,849
Patented June 6, 1972

3,667,849
LASER PLUMMET LEVEL
Robert L. Appler, Ellicott City, and Hubert H. Hoehn, Laurel, Md., assignors to Optic Sciences Corporation, Columbia, Md.
Filed Oct. 28, 1969, Ser. No. 871,922
Int. Cl. G01b 11/26
U.S. Cl. 356—152                5 Claims

ABSTRACT OF THE DISCLOSURE

A precision surveying instrument which projects orthogonal laser beam as datum references, the beams being perpendicular and parallel respectively to the local gravity vector to provide fixed horizontal and/or vertical references from which measurements can be made. Sensors of many forms, depending on the accuracy required, can probe these beams along their lengths to align a series of components or to measure deviations therefrom. No operator handling is necessary after the initial set-up and inadvertent compromise of the datum is avoided.

---

This invention relates to surveying devices and specifically to devices which transmit a beam whereby positions can be determined at considerable distances without the necessity of having a person sighting through the instrument and signaling to the remote position. In one specific aspect, this invention relates to a device for precise alignment of parallel azimuths. In another specific aspect, it relates to an instrument for providing a vertical reference beam from which measurements can be made.

The practices followed in surveying are well known but usually require a telescopic instrument which can be positioned as desired and from which sighting can be taken against objects at a distance. This requires an instrument man and a second man at some distance who provides or holds the target against which the instrument is trained. Very accurate measurements can be made in this fashion but there are certain inherent sources of error which cannot be avoided. In tunneling through the ground, where the above-grade azimuth is fixed, it is sometimes difficult to achieve a precise alignment of a remote below-grade azimuth. One of the sources of error is in the difficulty of precisely aligning a second instrument below another instrument above grade. Where the horizontal distances are great, a slight deviation or error in positioning the below grade instrument can result in considerable deviation at the target.

In laying sewer lines where the runs are straight between various collection points, such as man holes, it is necessary to maintain a reasonable slope to the line so that material will readily flow therethrough by gravity.

In the erection of tall buildings, it is necessary to have a vertical reference line from which measurements can be made so that verticality of the building can be maintained.

Where measurements of the types described above are made by human sighting through instruments, there is always the possibility of error which may be compounded to the point that the final structure does not have the desired alignment with whatever reference is applicable.

In accordance with the present invention, we have provided an instrument whereby errors in alignment are considerably minimized or eliminated and whereby much greater accuracy in alignment of azimuth beams or location of reference points can be achieved. We have provided a device which transmits a laser beam to a remote point by splitting off a component to provide exact or precise alignment at the reference point.

Figure 1:
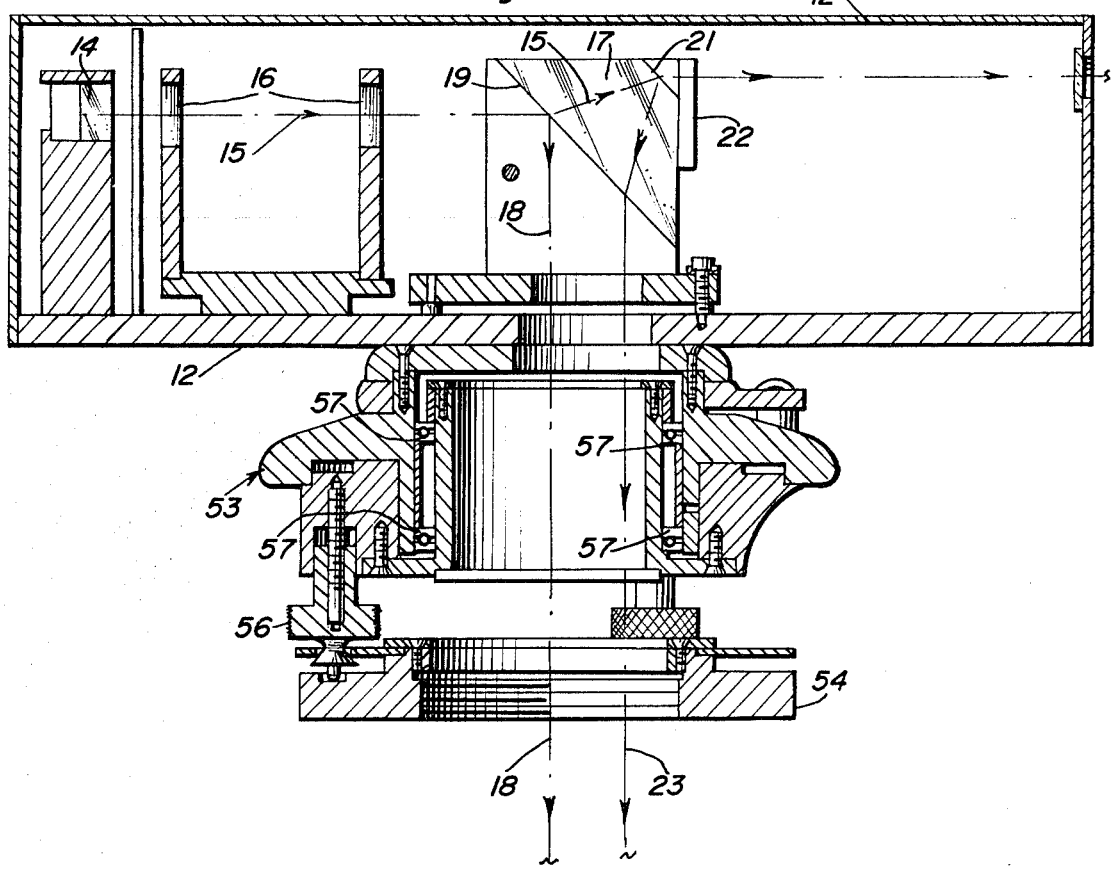
Figure 2:
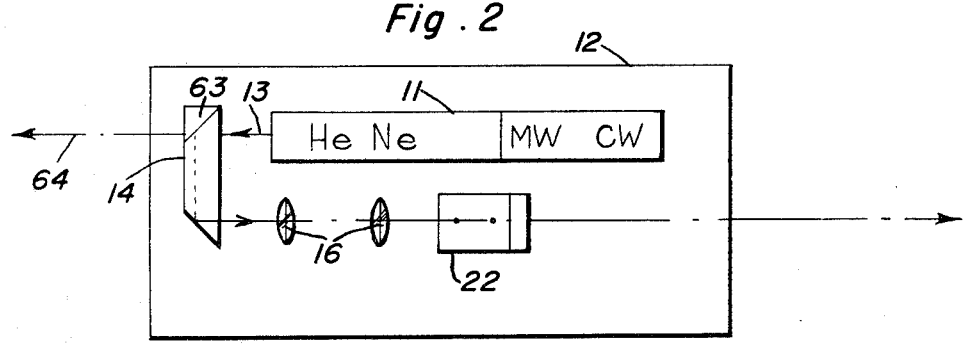
Figure 3:
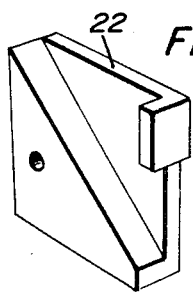
Figure 7:
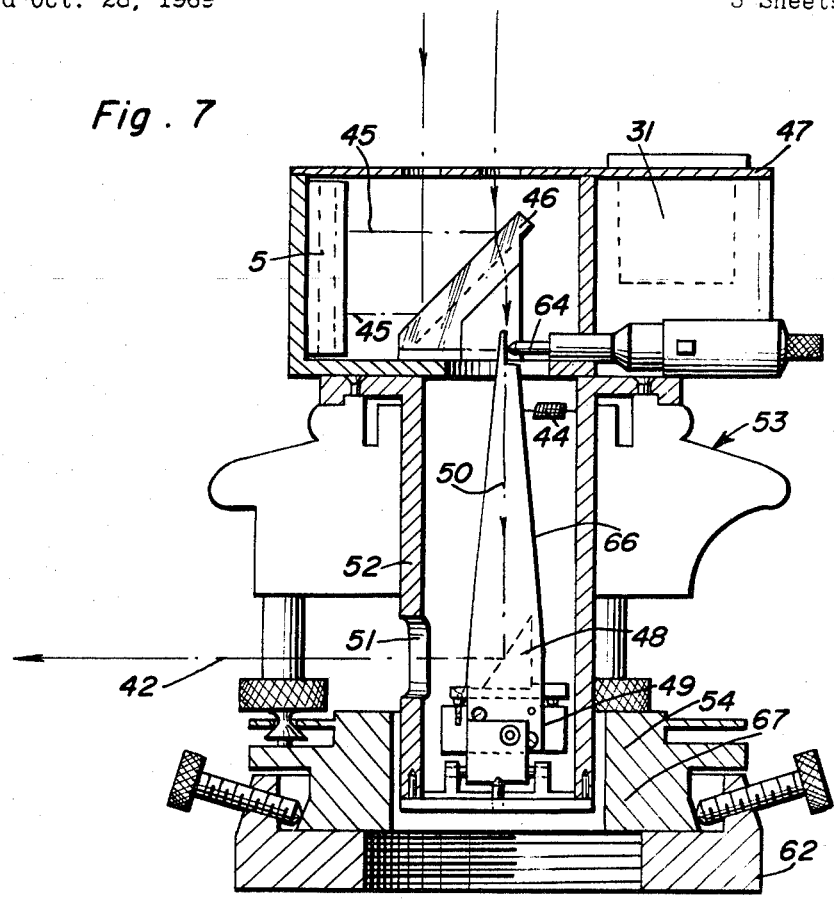
Figure 8:
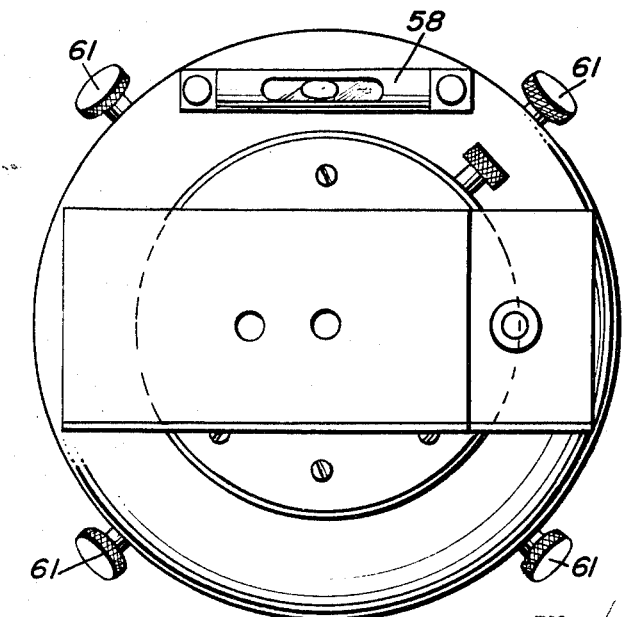

Our invention will be more fully illustrated by the following drawings in which:

FIG. 1 is a cross-sectional view of our laser plummet level;
FIG. 2 is a plan view of FIG. 1 with the top removed and showing the positioning of the essential elements;
FIG. 3 is a side view of a bracket adapted for holding the combination reflector and refractive element of FIG. 1;
FIG. 4 is an azimuth transfer unit adapted to receive reference beams from an instrument such as that shown in FIG. 1 and for alignment therewith;
FIG. 5 is a schematic representation of a sensing device used in positioning one azimuth transfer unit below the source unit;
FIG. 6 is a schematic representation of the source unit and the azimuth transfer unit illustrating the positioning of the two with respect to each other;
FIG. 7 is a cross-sectional view of an azimuth transfer unit having the reflector element positioned lower to the bottom of the instrument; and
FIG. 8 is a plan view of an instrument such as that shown in FIG. 4.

Referring now to the drawings and, at first, specifically to FIGS. 1 and 2, our system includes a laser generator 11 supported in a housing 12 and positioned to direct a beam 13 against a transfer prism 14 which reverses direction of the beam and reflects it as beam 15 through a collimating device 16 into a beam-splitter 17. The splitter reflects a primary beam 18 from the face along a path normal to that of laser beam 15. By using a splitter 17 of proper geometry, the refracted beam 15 is split at forward surface 21 and a second beam or reference beam is reflected normal to the original beam 15 and parallel to primary beam 18. The remainder of the beam transmitted by prism 17 is transmitted along a line slightly offset but parallel to the original beam 15.

Prism 17 is supported between a pair of brackets 22 (FIG. 3) which are mounted in housing 12 over an opening in the lower portion of said housing whereby the beams 18 and 23 emanate from the instrument normal to the original azimuth beam.

Primary beam 18 and reference beam 23 are reflected downwardly to a sensing device 25 comprising a pair of photo-diodes 26 and 27 which are positioned parallel to each other but separated by insulation 28. The current generated by beams 18 and 23 falling on photodiodes 26 and 27 passes to a differential amplifier 29 and then to a nullmeter 31 which is provided with a readout scale for indicating the differential in light falling on the photo-diodes. This nullmeter may be provided with an alarm 32 to give an audible signal when other than a null reading is given.

In some situations, it may be desirable to replace the differential amplifier with a ratio indicator responsive to voltage inputs. A ratio of unity would be the same as a null reading from the differential amplifier.

Sensing device shown in FIG. 5 may be positioned below an appropriate above-grade instrument as shown in FIG. 6. Once the sensing device is correctly aligned under the above-grade instrument, the latter can be moved to the lower position, aligned with the sensing device and used for projecting an azimuth beam using the original position as the original azimuth.

In one embodiment shown in FIG. 4, sensing device FIG. 5 is mounted in a separate unit called an azimuth transfer unit 34 which is provided with a beam-splitter 36 held in place by brackets 37 mounted within a housing 38 and supported on a base 39. The beam-splitter and supports are rotatable about a pivot 41 whereby a second azimuth beam 42 is reflected generally horizontally. The angle of beam 42 with the horizontal can be adjusted by means of a micrometer 43 against which base 39 is biased by spring 44. Thus, having determined the direction or azimuth of a run of sewer pipe, the horizontal angle of 42 can be adjusted to give the desired slope. By means of a target positioned in the end of a pipe section (not shown) pipe can be laid and positioned with the desired slope without having someone sight through a levelling instrument and give signals to some remote distance. Thus, the laying of pipe with a desired slope can be more easily and precisely accomplished.

In the embodiment shown in FIG. 7, the azimuth beam 42 is reflected from a point very close to the support on which the transfer unit rests. This is done by providing a beam-splitter 46 in an upper portion of housing 47 and positioning the sensing device 5 to intercept reflected beams 45 from splitter 46 and providing a second reflector 48 in a lower portion on an appropriate support 49 for receiving refracted beam 50 from beam-splitter 46 and reflecting it as an azimuth beam 42 through opening 51 in the side of the lower housing 52. The original laser unit and the transfer units are provided with an appropriate carriage 53 which is positioned on base 54 by means of screws 56 and is rotatable about the primary beam 18. By means of precision bearings 57 and appropriate levelling indicator 58 (FIG. 8), the instrument can be accurately aligned to the vertical. Lock screw 59 holds the instrument in place against further rotation once the desired azimuth is achieved.

On the azimuth transfer unit, the position of the reflector and sensors can be shifted by means of positioning screws 61 adapted to move the instrument without shifting the base 62, which is provided for mounting upon a suitable pedestal or support (not shown). Thus, a rough setting can be achieved by positioning the instrument about where it should be and the finer setting is achieved by means of positioning screws 61.

By means of an appropriate prism 63 positioned on transfer prism 14, a horizontal component 64 of original laser beam may be projected in the direction of beam 13.

The laser source is here shown as a helimum-neon laser tube 1 mw. and of the continuous wave type for our purposes, a continuous wave is preferable to a pulsed wave such as would be generated by a crystal laser. Also the beam emitted by a crystal laser is much more powerful and dangerous to persons who come into contact with it.

To avoid error that might be caused by sunlight or other stray light falling on the sensors, we prefer to modulate the beams striking the sensors. Then by use of an electronic filter in the detection circuitry, the instrument is thus rendered blind to stray light.

The beam can be modulated by use of a chopper to interrupt the power supply to the laser at the desired frequency. Another means is to interrupt the beam mechanically by appropriate means at the desired frequency. A rotating fan or a vibrator such as a tuning fork properly positioned are suitable means. Other equivalent means may be substituted.

By use of laser beams, sightings can be made at considerable distances without having to move the instrument as is necessary with conventional levels.

In the construction of tall buildings, achieving a true vertical is often difficult. The usual practice is to suspend a heavy weight from the end of a long wire which extends from the top of the construction to the ground. However, this acts as a pendulum and wind currents can produce oscillations which result in considerable error. By providing a reflector 17 to project the reference beam upwardly, absolute verticality can be achieved and measurements can be made from the vertical beam.

Our device is likewise adapted to use in mine shaft construction, structural monitoring, ship building, aircraft homing, tunnel construction, pipe laying. These are but a few of the uses to which this device is adapted and other uses will be obvious to those skilled in the art and are fully contemplated within the scope of the present invention.

In order to maintain the precision of the instrument described herein, the surface on which shaft 64 of micometer 43 rotates should be especially hardened to prevent wear. All of the parts are carefully machined so that the horizontal and vertical beams are accurate to plus or minus 1 arc second.

Other modifications may be apparent to those skilled in the art and are fully within the purview of our invention, the scope of which is defined by the appended claims.

We claim:

1. A surveying device of the type described comprising in combination means emitting a collimated laser beam, a beam-splitter disposed across the path of said laser beam to reflect a primary beam in a direction normal to said laser beam and a reference beam parallel to said primary beam while transmitting an azimuth beam, adjustable transfer means receiving said primary beam and directing it in a predetermined direction, paired sensors mounted on said transfer means receiving said primary and said reference beams and emitting a signal in accordance with the light received, means receiving and relating the signals received from said sensors, means for positioning said sensors and said transfer means to equalize the signals from said sensors whereby a second azimuth beam is reflected parallel to the original azimuth beam and means adjusting said transfer unit to give a predetermined inclination to said second azimuth beam.

2. The device of claim 1 wherein the sensors are mounted on an azimuth transfer unit having a reflector for receiving said primary beam and reflecting it in a predetermined direction.

3. The device of claim 1 having adjustable means directing said azimuth beam in a predetermined direction.

4. A device of the type described comprising in combination means emitting a continuous laser beam, means directing said laser beam along a predetermined path, a beam-splitting prism disposed across the path of said directed laser beam to reflect a primary beam and a reference beam parallel thereto while transmitting an azimuth beam, transfer means disposed remotely from said prism receiving said primary beam and reflecting it along a predetermined azimuth, light responsive means associated with said transfer means receiving said primary and said reference beams and emitting a signal in accordance with the light received, means receiving and relating the signals received from said sensors, means for positioning said sensors and said transfer means to equalize the signals from said sensors whereby a second azimuth beam is reflected parallel to the original azimuth beam and means for adjusting said transfer unit to give a predetermined inclination to said second azimuth beam.

5. The device of claim 1 wherein the sensors comprise a pair of silicon diodes mounted parallel to each other, said diodes being mounted for rotation about an axis between said diodes and intermediate the ends thereof, a differential amplifier connected to said diodes, a nullmeter connected to said differential amplifier and a reader indicating differences in the intensity of the light striking said paired diodes.

References Cited

UNITED STATES PATENTS

| | | | |
|---|---|---|---|
| 2,952,779 | 9/1960 | Talley | 250—203 X |
| 3,471,234 | 10/1969 | Studebaker | 356—3 |

OTHER REFERENCES

Fouss, James L., et al., "The Laser in Construction: 'Lite-Line' Guides a Pipeline," Laser Focus, December 1968, pp. 31–34, 39 and 40.

RONALD L. WIBERT, Primary Examiner

T. MAJOR, Assistant Examiner